(12) United States Patent
Hillhouse

(10) Patent No.: US 7,611,170 B2
(45) Date of Patent: Nov. 3, 2009

(54) HOSE COUPLING

(75) Inventor: Donald R. Hillhouse, Silver Springs, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 265 days.

(21) Appl. No.: 11/526,964

(22) Filed: Sep. 26, 2006

(65) Prior Publication Data

US 2008/0073908 A1 Mar. 27, 2008

(51) Int. Cl.
*F16L 33/00* (2006.01)

(52) U.S. Cl. .................. 285/244; 285/276; 285/305; 285/321; 239/588

(58) Field of Classification Search .......... 285/276, 285/280, 281, 239, 242, 244, 241, 278, 305, 285/323, 140.1, 139.2, 139.3, 137.11, 255, 285/321; 239/373, 588
See application file for complete search history.

(56) References Cited

U.S. PATENT DOCUMENTS

| | | | |
|---|---|---|---|
| 3,921,297 A | 11/1975 | Vit | |
| 4,192,464 A * | 3/1980 | Chow | 239/373 |
| 4,519,449 A | 5/1985 | Hoskins et al. | |
| 4,526,411 A * | 7/1985 | Bartholomew | 285/305 |
| 4,538,679 A | 9/1985 | Hoskins et al. | |
| 4,592,388 A * | 6/1986 | Wilcox | 137/615 |
| 4,612,953 A | 9/1986 | Caroll et al. | |
| 4,632,436 A * | 12/1986 | Kimura | 285/305 |
| 4,640,534 A | 2/1987 | Hoskins et al. | |
| 4,749,214 A | 6/1988 | Hoskins et al. | |
| 4,813,716 A * | 3/1989 | Lalikos et al. | 285/148.14 |
| 4,867,487 A * | 9/1989 | Phillis | 285/305 |
| 4,875,709 A | 10/1989 | Caroll et al. | |
| 4,902,043 A | 2/1990 | Zillig et al. | |
| 4,929,236 A * | 5/1990 | Sampson | 604/175 |
| 5,307,995 A | 5/1994 | Jackson et al. | |
| 5,395,141 A | 3/1995 | Kakuske | |
| 5,586,792 A | 12/1996 | Kalahasthy | |
| 5,909,901 A | 6/1999 | Zillig et al. | |
| 5,924,633 A * | 7/1999 | Brass et al. | 239/373 |
| 5,931,510 A | 8/1999 | Mathew et al. | |
| 6,155,497 A | 12/2000 | Hudson, Jr. et al. | |
| 6,209,804 B1 * | 4/2001 | Spriegel | 239/373 |
| 6,347,729 B1 | 2/2002 | Spriegel | |
| 6,505,866 B1 * | 1/2003 | Nakamura et al. | 285/423 |
| 6,672,628 B2 | 1/2004 | Thomas et al. | |
| 7,370,889 B2 * | 5/2008 | Maunder et al. | 285/242 |

* cited by examiner

*Primary Examiner*—David E Bochna
(74) *Attorney, Agent, or Firm*—Kenneth J. Lukacher; Martin Lukacher

(57) ABSTRACT

A hose having a compressible wall which is adapted to be connected at one end thereof to a nozzle of a sprayer. The other end is attached to a stub pipe or stem extending from a tank of the sprayer which can contain a pressurized liquid which flows through the hose and is sprayed via the nozzle. The coupling provides a quick connection for the hose to the pipe stem and also allows the coupling/hose assembly to freely rotate 360° while remaining sealed. The coupling is an assembly of a nipple and a sleeve retainer having a throat which compresses the hose wall and provides a retainer, retaining the end of the hose on the nipple. A spring clip is sprung apart as the assembly of retainer, nipple, and hose is seated on the pipe stem. To disconnect or release the coupling, the spring clip is spread apart to free the assembly.

11 Claims, 5 Drawing Sheets

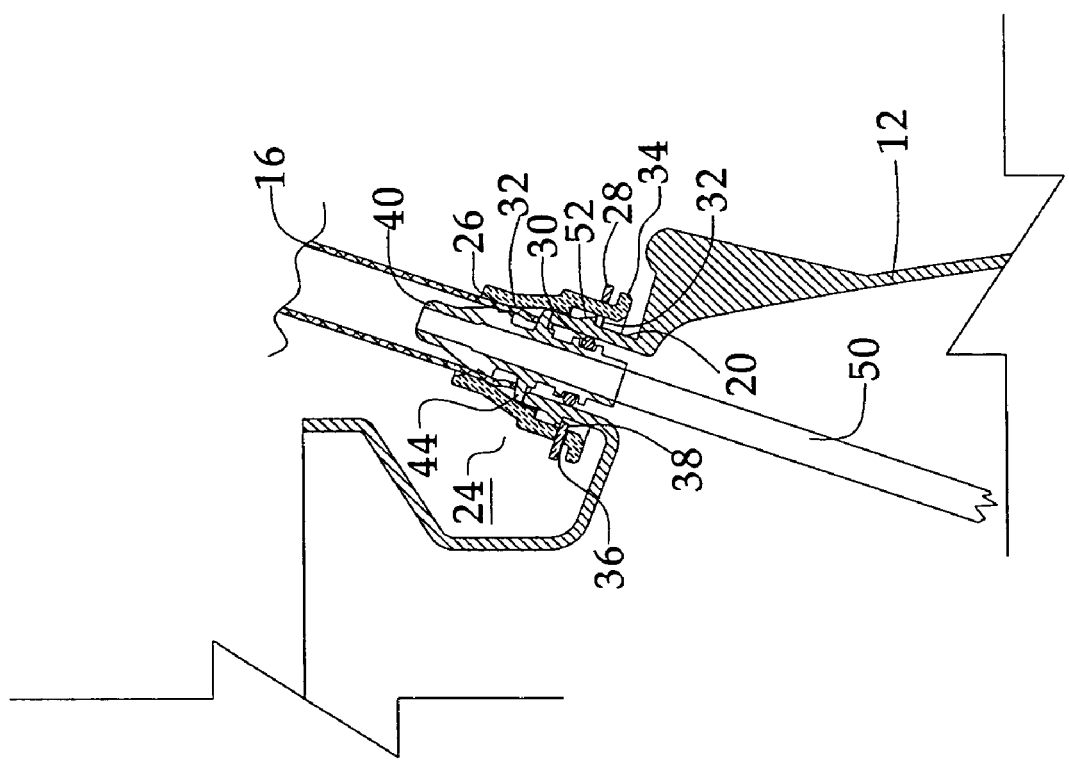

HOSE COUPLING

The present invention relates to an improved hose coupling, and particularly to a coupling which enables quick connection of the hose to a pipe, such as a stub or pipe stem extending from a tank of a sprayer, and also allows the hose/coupling assembly to freely rotate about the axis of the pipe stem. The sprayer may contain a pressurized liquid which is driven under pressure (or vacuum) through the pipe and hose to a nozzle.

The hose coupling provided by the invention is an integrated assembly of a nipple and a retainer sleeve which compresses the wall of the hose between a throat of the sleeve and the nipple. This assembly may be packaged with the hose and the nozzle, if attached to the hose, together with the tank and pump of the sprayer in the same container. The retainer of the coupling has a spring clip with inward projections extending to slots in the retainer which are spread apart and latched over a ring, such as a tapered barb, on the pipe stem as the assembly is seated on the pipe stem, thereby providing a quick connect mechanism. The coupling may be disconnected or released by spreading the clip so that the projections clear the barb on the stem.

Integrated connector assemblies which are provided with a latching mechanism to afford quick connection capability to a pipe have heretofore not been available. Rather, the couplings have required threaded nuts and a threaded stem which required assembly to form the connector and did not have a latching mechanism, especially one with a spring clip which automatically connects a retained hose on a pipe when the coupling is attached to the pipe. Such screw-on connectors are shown for example in Spriegel U.S. Pat. No. 6,209,804, issued on Apr. 3, 2001, and U.S. Pat. No. 6,347,729, issued Feb. 19, 2002. Furthermore, such screw-on type connectors have a tendency of loosening with movement of the hose. Spring clips have been used in connectors but not in a quickly connectable latching mechanism which operates automatically to attach an assembly of a hose, a nipple, and a retainer for the hose on the nipple to a pipe. Such spring clips are shown in connectors described in the following U.S. Pat. No. 5,909,901, issued Jun. 8, 1999, U.S. Pat. No. 5,586,792, issued Dec. 24, 1996, and U.S. Pat. No. 5,395,141, issued Mar. 7, 1995.

Accordingly, it is the principal object of the present invention to provide an improved hose coupling.

It is another object of the present invention to provide a hose coupling in which an integrated assembly of a nipple and a retainer and hose in compressed relationship between the nipple and the retainer may be quickly connected to a pipe by a spring clip latching mechanism.

It is a further object of the present invention to provide a hose coupling especially adapted for coupling a hose, on an end of which a sprayer nozzle, to a pipe stem extending from a tank of the sprayer, which may contain pressurized liquid to be sprayed, so as to afford an integrated assembly that may be packaged together with the hose and the other parts of the sprayer, and which is provided with a quick connecting latching mechanism for attaching the hose coupling to the pipe stem extending from the sprayer tank.

It is a still further object of the invention to provide an improved hose coupling which can maintain a sealed connection that has 360° rotational ability without tendency to loosen the connection.

Briefly described, a coupling for connection of a hose with a wall of compressible thickness to a pipe stem has a coupling in which the hose wall is compressed between a nipple having a flange and a portion below the flange in which an O-ring is captured. Above this flange the nipple provides a receptacle for the hose. A retainer for the hose on the nipple is provided by a sleeve disposed around the nipple having a narrow throat which compresses the wall of the hose between the retainer and the nipple and provides an integrated assembly of the hose, the retainer, and the nipple. A spring clip has inward projections which extend through slots in the retainer. The pipe stem has a tapered ring forming a barb over which the retainer extends and which spreads the spring clip as the integrated assembly is seated with the flange on the end of the pipe stem, and forms a latching mechanism for the integrated assembly on the pipe stem. To release the coupling, the spring clip is spread so that its inward projections clear the tapered ring and allows the integrated assembly to be removed from the pipe stem.

The invention further embodies a system for coupling a hose to a sprayer tank having a pipe stem member with a first end extending from the tank and a second end having an outwardly extending annular projection or barb, a receptacle member attached to one end of the hose and having a flange locatable against the pipe stem member, and a retaining member locatable over the receptacle member to retain the receptacle member to the pipe stem member. The system further has a latching member, such as the spring clip, for latching the retaining member to the annular projection of the pipe stem member, thereby coupling the retaining member, receptacle member, and the hose extending from the receptacle member, to the tank, in which the latching member is manually releasable from the annular projection of the pipe stem member to remove the retaining member, receptacle member, and the hose extending from the receptacle member, from the tank. When latching member is latched to the annular projection of the pipe stem member, the assembly of the retaining member, receptacle member, and the hose extending from the receptacle member are rotatable around the pipe stem member.

The foregoing and other objects, features and advantages of the invention will become apparent from a reading of the following description in connection with the accompanying drawings in which:

FIG. 4 is a sectional view of the coupling and a portion of the tank, the section being along the line A-A in FIG. 1a.

Figure 1:
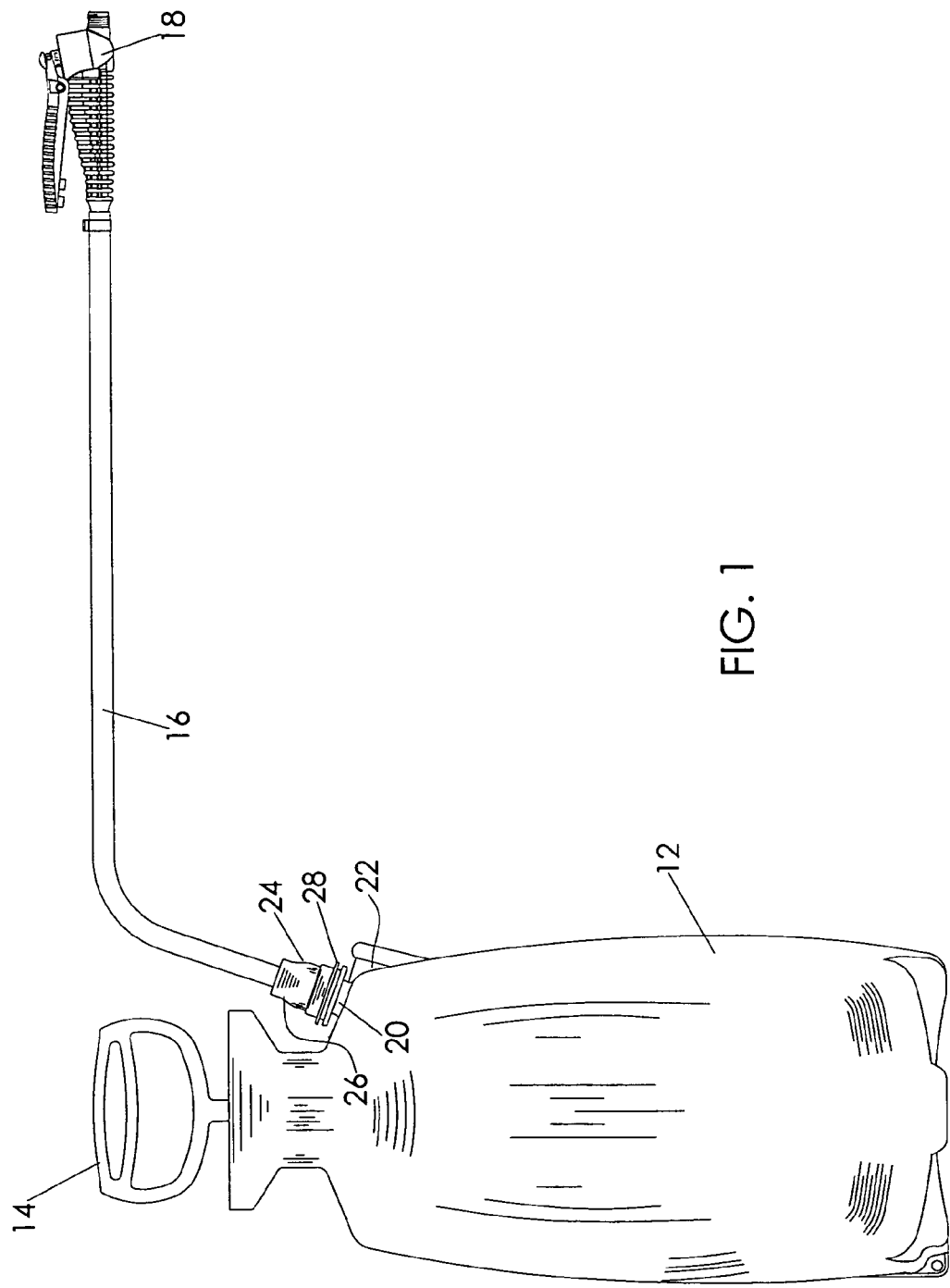
FIG. 1 is a front view showing a sprayer apparatus including a sprayer tank and a hose with a nozzle at the end thereof which is attached to a stub or stem pipe extending from the tank by a coupling provided in accordance with the invention.
Figure 1A:
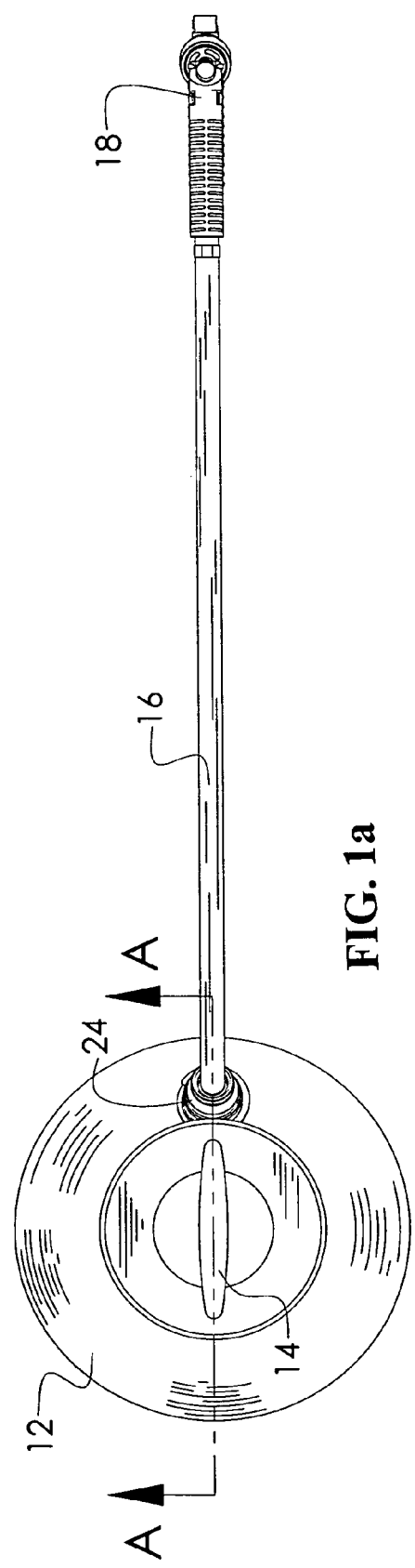
FIG. 1a is a top view of the apparatus shown in FIG. 1.

Referring to FIG. 1 and FIG. 1a, there is shown a sprayer 10 having a tank 12 in which a pump mechanism operated by reciprocating a handle 14 extends into the tank and seals the top thereof. The pump pressurizes the tank 12. This liquid is delivered via a hose 16 to a nozzle 18 which may be clamped to the hose and contains a handle operated valve which when depressed allows a jet or spray of liquid to emanate from the nozzle. The hose 16 is attached to a pipe stem 20, or tubular segment, extending from the tank 12. This pipe stem 20 may be buttressed by a rib 22. The hose is connected to this stem by a coupling 24 provided in accordance with the invention. FIG. 1 shows the outside retainer sleeve 26 and the spring clip latch 28 of the coupling 24.

Figure 2:
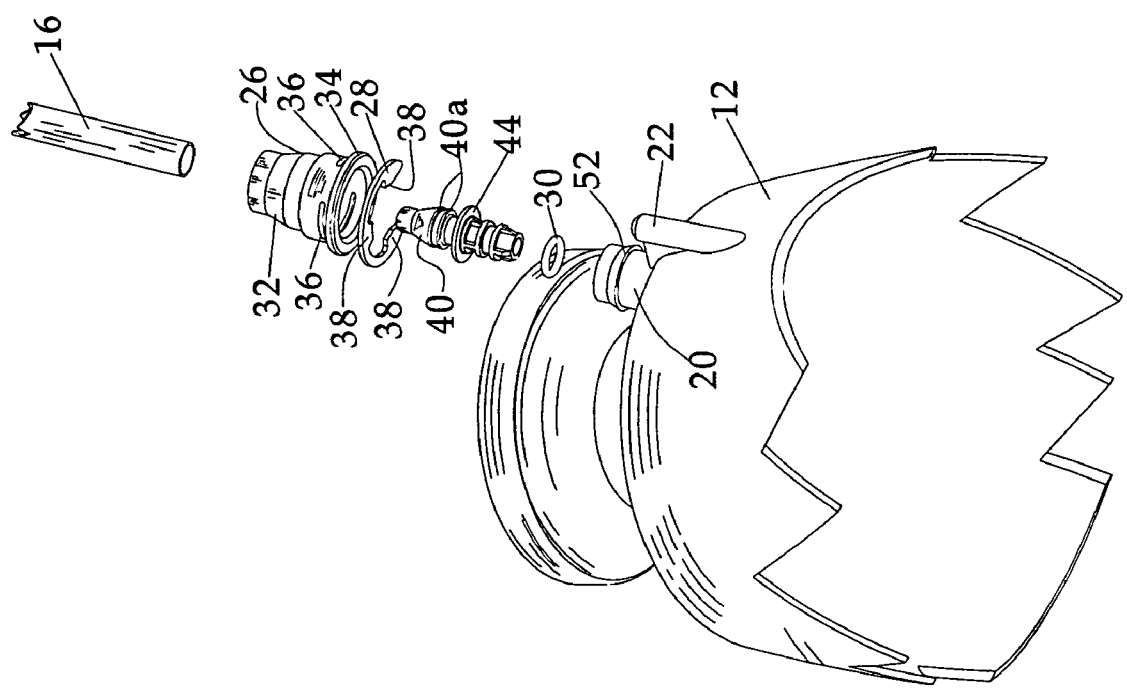
FIG. 2 is a perspective view showing a portion of the tank of the sprayer of FIG. 1 and the coupling also shown in FIG. 1, the view being taken from the lower right side as viewed in FIG. 1.
Figure 3:
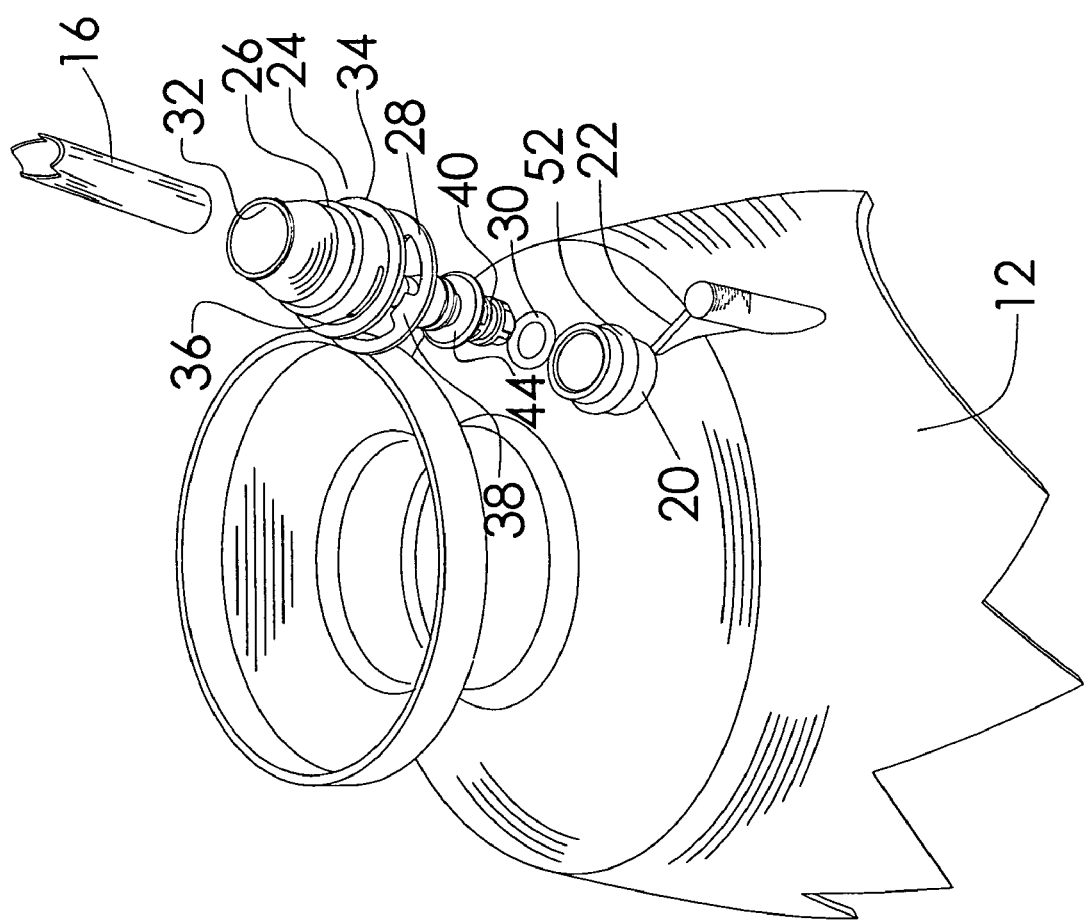
FIG. 3 is a view similar to FIG. 2, but taken from the upper right side in FIG. 1.

As shown in FIGS. 2, 3, and 4, the hose 16 is a conventional hose of elastic material, such as rubber, having a compressible wall. The tank 12 and the coupling parts may be metal or plastic, except for a rubber O-ring 30, and spring clip 28.

The retainer 26 is a sleeve having an inwardly tapered throat 32 and a skirt 34 above which are slots 36 for radially inward projecting portions or legs 38 of clip 28. The clip 28 may be a metal clip of the type conventionally known as an E-ring or washer since it has the inward projections 38 projecting inwardly from the ends and the center thereof.

The coupling 24 also includes a hose retainer 40 in the form of tubular nipple. The nipple 40 has an upper or inwardly tapered portion of a shape complimentary to the throat 32 of the retainer sleeve 26. This portion may have a barbed surface, such as annular barbs 40a. The upper portion of the nipple 40 ends at a flange 44 which provides a seat or stop for the integrated assembly of the retainer 26, the nipple 40 and the retainer sleeve 26 is shown in assembled relationship in FIG. 4, where the assembly is seated on the pipe stem 20.

The nipple 40 has a lower portion below the flange 44 which is grooved to capture the O-ring 30. If desired, a tube 50 (FIG. 4) may be inserted into the passageway through the nipple 40. This tube may extend to the bottom of the tank to facilitate the collection of the liquid in the tank.

The retainer sleeve 26 compresses the walls of the hose 16 between the inside of the tapered portion thereof and the upper or inwardly tapered portion of the nipple 40. The spring clip 28 may also be assembled in the slots 36 above the skirt of the sleeve 26. This provides an integrated assembly which in accordance with a feature of the invention may be packaged in the same container as the other components of the sprayer.

The latching mechanism is provided by the spring clip 28 and a tapered annular or ring like projection, ridge or barb 52 on the pipe stem 20.

In operation, the integrated assembly is assembled on the pipe stem 20 by inserting the lower portion of the nipple 40 into the opening in the stem 20 until the flange 44 seats against the upper end of the stem 20. As the integrated assembly is seated, the tapered portion of the barb 52 spreads apart the spring clip 28, and releases the spring clip as it passes over the barb so as to come into latching relationship with the flat surface on the under side of the barb 52. The O-ring 30 then also provides a seal between nipple 40 and the inner periphery of the pipe stem opening. In order to disconnect the hose, the spring clip is spread apart, for example, manually or with the aid of pliers and the hose and integrated assembly lifted off the pipe stem 20. Accordingly, the coupling 24 provides a quick connection for the hose on the pipe stem of the tank making the sprayer rapidly available for operation.

The integrated assembly, including the retainer sleeve 26, receptacle nipple 40, hose 16 and spring clip 28, is free to rotate about the axis of the pipe stem 20 when seated and latched on the pipe stem 20. It is a feature of the invention to provide such rotation thereby eliminating stress in the hose as the hose is turned or twisted in operation even over 360° of rotation, and without loosening the connection.

From the foregoing description it will be apparent that there has been provided an improved hose coupling having quick connection capability and which may be mounted as an integrated assembly with a hose. Variations and modifications in the herein described coupling, within the scope of the invention, may become more apparent to those skilled in the art. Accordingly, the foregoing description should be taken as illustrative and not in a limiting sense.

The invention claimed is:

1. A coupling for connection of a hose with a wall of compressible thickness to a pipe, which coupling comprises a nipple having a flange bearing upon an end of the pipe and having a portion projecting into said pipe in sealing relationship therewith, said nipple providing a receptacle for said hose extending into said hose, a retainer for said hose on said receptacle being provided by a sleeve disposed around said nipple and over said pipe, said sleeve narrowing into a throat spaced from said nipple less than the thickness of said wall compressing said wall between said throat and said nipple, and a spring clip having inward projections extending through openings in said sleeve and latching upon an outwardly extending projection from said pipe.

2. The coupling according to claim 1 wherein said clip is a C or E clip, said inward projections forming legs of the C or E with a base of said clip.

3. The coupling according to claim 1 wherein said sealing relationship is provided by an O-ring captured in said nipple and a portion thereof which extends into said pipe.

4. The coupling according to claim 3 wherein said hose assembled with said retainer sleeve and said nipple by said spring clip and bearing upon said pipe where said flange seats on said stem are rotatable about said pipe.

5. The coupling according to claim 1 wherein said outwardly extending projection is a ring having a tapered surface tapering outwardly from said pipe in a direction away from said pipe, and upon which said flange bears, said ring having a flat surface extending radially outward providing a latching surface for said inward projections of the spring clip.

6. The coupling according to claim 5 wherein said ring defines a barb.

7. The coupling according to claim 1 wherein said nipple has a barbed surface engaging said hose wall on the inside thereof and extending outwardly toward said throat of said retainer sleeve.

8. The coupling according to claim 1 wherein said pipe is a tubular stem extending from a tank of a sprayer from which pressurized liquid into said tank is sprayed from a nozzle on an end of said hose opposite to the end thereof connected to said stem.

9. A system for coupling a hose to a sprayer tank comprising:
 a first member having a tubular segment with a first end extending from said tank, and a second end having an outwardly extending annular projection;
 a second member attached to one end of the hose and having a flange locatable against said second end of said first member;
 a third member positionable over said second member to retain said second member to said first member;
 a spring mechanism for latching the third member to said annular projection of said first member to couple said third member, said second member, and said hose extending from said second member, to said tank, in which said latching mechanism is manually releasable from said annular projection of said first member to remove said third member, said second member, and said hose extending from said second member, from said tank.

10. The system according to claim 9 wherein said latching mechanism comprises openings in said third member and a spring clip having a plurality of inward projections, extending via said openings of said third member, which are locatable under the annular projection of said first member.

11. The system according to claim 9 wherein when said latching mechanism is latched to said annular projection of said first member, and wherein said third member, said second member, and said hose extending from said second member are rotatable around said first member.

* * * * *